United States Patent
Komissarov et al.

(10) Patent No.: US 11,043,019 B2
(45) Date of Patent: Jun. 22, 2021

(54) METHOD OF DISPLAYING A WIDE-FORMAT AUGMENTED REALITY OBJECT

(71) Applicant: DEVAR ENTERTAINMENT LIMITED, Nicosia (CY)

(72) Inventors: Andrey Valeryevich Komissarov, Tula (RU); Vitaly Vitalyevich Averyanov, Tula (RU)

(73) Assignee: DEVAR ENTERTAINMENT LIMITED, Nicosia (CY)

( * ) Notice: Subject to any disclaimer, the term of this patent is extended or adjusted under 35 U.S.C. 154(b) by 0 days.

(21) Appl. No.: 16/630,625

(22) PCT Filed: Jul. 13, 2017

(86) PCT No.: PCT/IB2017/054244
§ 371 (c)(1),
(2) Date: Jan. 13, 2020

(87) PCT Pub. No.: WO2019/012314
PCT Pub. Date: Jan. 17, 2019

(65) Prior Publication Data
US 2021/0118216 A1    Apr. 22, 2021

(51) Int. Cl.
*G06T 15/04* (2011.01)
*G06T 17/00* (2006.01)
*G06T 19/00* (2011.01)

(52) U.S. Cl.
CPC .............. *G06T 15/04* (2013.01); *G06T 17/00* (2013.01); *G06T 19/006* (2013.01)

(58) Field of Classification Search
None
See application file for complete search history.

(56) References Cited

U.S. PATENT DOCUMENTS

| | | | |
|---|---|---|---|
| 9,305,401 | B1 | 4/2016 | Rudin et al. |
| 9,618,747 | B2 * | 4/2017 | Villmer .................. G06F 3/012 |
| 2016/0217590 | A1 | 7/2016 | Mullins et al. |
| 2016/0335809 | A1 | 11/2016 | Forutanpour et al. |
| 2017/0103569 | A1 | 4/2017 | Wu et al. |

* cited by examiner

*Primary Examiner* — Robert J Craddock
(74) *Attorney, Agent, or Firm* — Nadya Reingand; Yan Hankin

(57) ABSTRACT

The invention relates to computer data processing, and more particularly to methods of displaying an augmented reality object based on an original image, which involves generating a 3D model of an augmented reality object; obtaining a plurality of individual fragments of an image of a real-world object, where each fragment is a partial photographic image of the real-world object, obtained using a camera; generating a two-dimensional image of the real-world object by aligning the obtained image fragments; generating a transformation matrix for transforming the coordinates of the two-dimensional image of the real-world object into intrinsic coordinates corresponding to coordinates of the 3D model; and, using the coordinate transformation matrix, coloring elements of the 3D model of the augmented reality object in accordance with the colors of the corresponding elements of the real-world object, where coloring is carried out by texturing areas of the 3D model of the augmented reality object.

7 Claims, 1 Drawing Sheet

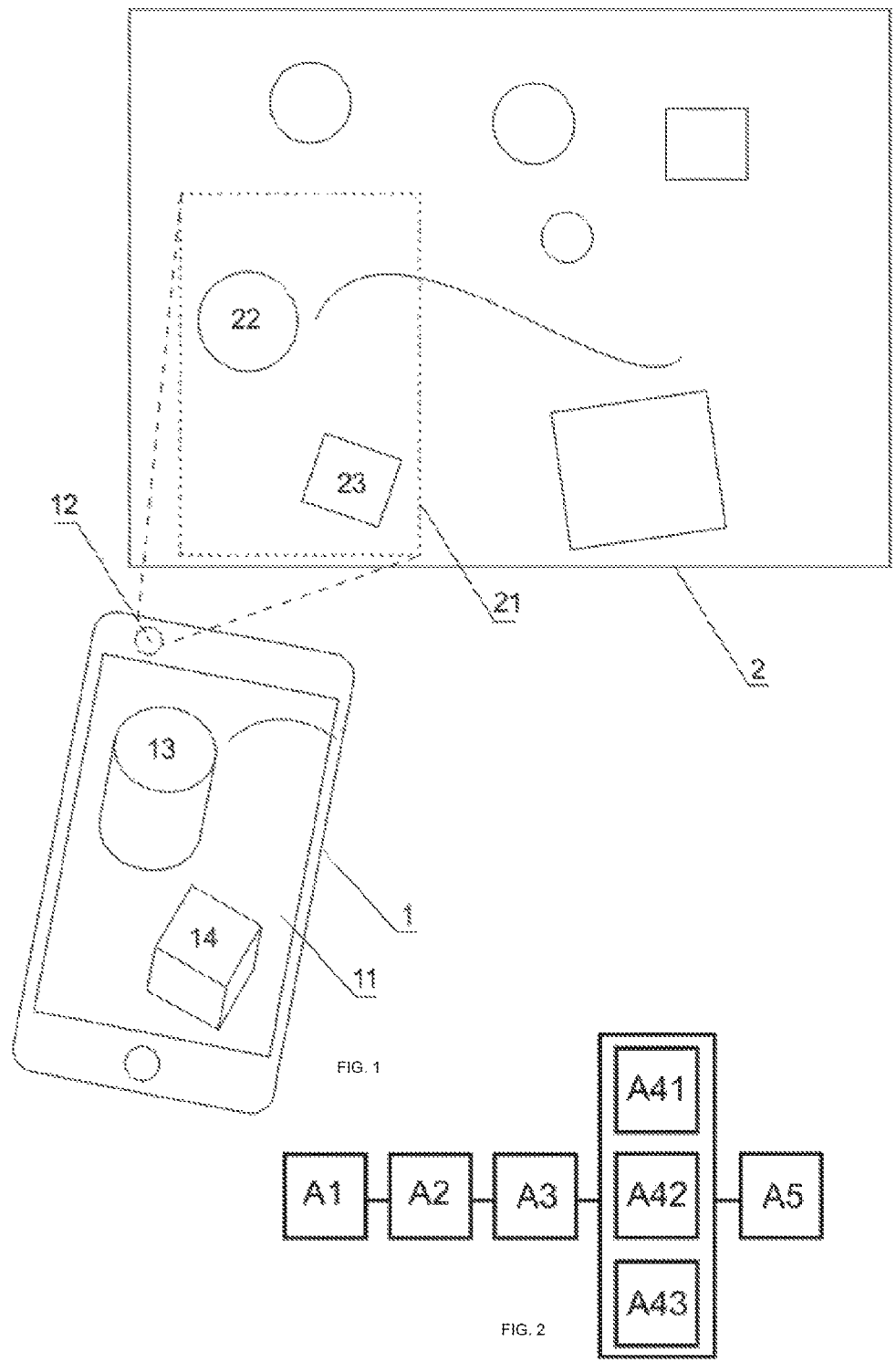

METHOD OF DISPLAYING A WIDE-FORMAT AUGMENTED REALITY OBJECT

FIELD OF INVENTION

The invention relates to computer data processing, namely, to methods for displaying an augmented reality object, based on an original image, when: a photo or video image of a real object is created, a real object is detected, a coordinate transformation matrix is generated, a 3D model of the augmented reality object is generated and stored in the memory of the device for displaying the augmented reality object, the elements of the 3D model of the augmented reality object are colored in the colors of the original image, it is produced visualization of 3D model of the object of augmented reality with the use of augmented reality tools and/or computer vision algorithms.

The following terms are used herein.

A virtual object is an object created by technical means, transmitted to a person through his senses: sight, hearing, and others.

Augmented reality is a perceived mixed reality created using "elements" of perceived reality "supplemented" by the computer (when real objects are mounted in the field of perception).

A device for creating and viewing virtual augmented reality objects is any computer device that has a display and a video camera that can display an image from a video camera in real time and display an additional virtual image. Typical examples of such a device are a smartphone, a tablet computer, a computer with a headset in the form of glasses of augmented reality such as Google Glass and the like.

Smartphone (smart phone)—a cell phone, supplemented by the functionality of a pocket personal computer.

Texturizing is a transferring the texture of the captured image to the corresponding virtual object. Texturizing a three-dimensional model is a combination of ways to determine the color of each of its pixels on the screen. Each polygon of the model is associated with a polygon with the same number of angles on the texture (usually the model consists of triangles and quadrilaterals). This conformity is determined by the UVW sweep of the model. Then, knowing the screen coordinates of the model's polygon, it is pixel-by-pixel transferred to the screen in accordance with UVW, adding lightning colors, shadows and other effects to the color of the texture.

PRIOR ART

Currently, an increasing number of people use various electronic devices and interact with virtual objects. This happens not only in computer games, but also in the learning process, as well as, for example, in remote goods trading, when the buyer decides to purchase using a virtual product model.

The method of displaying the object of augmented reality and its texturizing based on the original image is known from RF patent claim No. 2586566. In accordance with the method disclosed there, a 3D model of the augmented reality object is formed and stored in the memory of the augmented reality device, both with the reference image, and also the coordinates of the texturizing sites, corresponding to the polygons of the 3D model of the augmented reality object, a photo or video image of the real object is received, real object is recognized on the basis of the received photo or video images, the coordinate transformation matrix at the image or video image of the real object into its own coordinates, the elements of the 3D model of the augmented reality object are colored in the colors of the corresponding elements of the photo or video image of the real object by forming the texture of the image sensing area using the matrix of coordinate transformation and interpolation of data with the subsequent assignment of the 3D model texture of the augmented reality object, so that the corresponding polygons are covered by the corresponding sections of the texture by infection it generated at stage texturizing coordinates, resulting 3D model of the object is rendered on top of the augmented reality video series real object.

This method is the closest in terms of technical essence and achieved technical result.

The disadvantage of the known method is the inability to display objects of augmented reality when scanning wide-screen real objects that do not fit entirely in the eyeshot of the video camera of the device for displaying the objects of augmented reality for which this object of augmented reality is created. The known method is well suited for small objects that fit completely in the eyeshot of the video camera of the device for displaying objects of augmented reality, but when trying to work with wide-format objects, technical problems arise related to the need for gluing fragments and forming a 3D model and its texturizing in partial images.

DISCLOSURE OF THE INVENTION

Based on this original observation, the present invention is mainly aimed at proposing a method for displaying an augmented reality object, which mitigates at least one of the above disadvantages, namely, enabling the displaying of augmented reality objects when scanning wide-screen real objects, which do not fit entirely in the eyeshot of the video camera of the device for displaying the objects of augmented reality, for which a specified object of augmented reality is created, which, in turn, develops the existing technics and technology, bringing it to a new level.

In order to achieve this goal
- a number of separate fragments of the image of the real object are received, where each fragment is a partial photo image of the real object received from the camera of the device or extracted from the video sequence obtained from the camera of the device,
- a two-dimensional image of a real object is formed by combining the resulting fragments, while determining the missing fragments that are missing in order to build such a conjoint image and a request (or signal) is sent to the device designated to display the augmented reality object, regarding the need to obtain an additional photo or video image of the missing fragment of the real object,
- a matrix for transforming the coordinates of a two-dimensional image of a real object into its own coordinates corresponding to the coordinates of the 3D model is formed;
- the corresponding 3D model elements are colored using the coordinate transformation matrix, in the colors/textures of the corresponding elements of the real object represented by the generated two-dimensional image in one of three ways:
   - texturizing regions of individual elements of the 3D model of the augmented reality object is performed by superimposing on them the textures of the corresponding separate fragments of the real object, and/or the areas of the 3D model of the augmented reality object are textured with the indication for each object of which area of the texture it corresponds, using the Tile/Offset parameters, as described below, and/or producing texturizing of the entire 3D model of the augmented reality object at once, while gluing individual texturized fragments into one texture.

Thanks to these advantageous characteristics, it becomes possible to display objects of augmented reality when scanning wide-screen real objects that do not fit entirely in the eyeshot of the video camera of the device displaying augmented reality objects for which the augmented reality object is created. That is, at each instant the device displaying the augmented reality object receives only a part of the information when scanning wide-screen real objects, and displays the necessary fragment of the augmented reality object corresponding to the given section of the real object.

In one embodiment of the invention, when combining (or "gluing") individual textured fragments into a single image, "mashing the seams" is performed—the procedure of fitting certain fragments to others with a smooth transition. For example, when multiple photos are combined to create a panorama image in such a way that one photo continues with another, in most cases visible seams appear. This occurs due to gluing discrepancies, as well as discrepancies arising because of moving the camera between frames, changing the illumination, changing the shooting settings, etc.

One way to remove these transitions includes the following steps:

1. Determining the pixels of the splice junction line;
2. Taking the neighboring "left" and "right" pixels with an indent of N pixels for each of these pixels;
3. Drawing a smooth gradient between these "left" and "right" pixels.

Due to this advantageous feature, it becomes possible to smooth out discrepancies between individual fragments. Due to the use of augmented reality techniques, it is possible to determine at the stage of taking photo, which part of the object is visible to the camera, which allows to determine where the seams are located.

BRIEF DESCRIPTION OF DRAWINGS

Other features and advantages of the present invention clearly follow from the description, as provided below for the purposes of illustration and not being limiting, with reference to the accompanying drawings wherein:

FIG. 1 shows the appearance of the system for displaying the augmented reality object according to the invention, FIG. 2 schematically depicts the stages of the method for displaying an augmented reality object according to the invention.

In FIG. 1, an augmented reality object displaying device 1 is shown, having a display 11 and a video camera 12 aimed at a real wide-format object 2. Devices such as a smartphone, a computer tablet or devices of the type of added reality glasses can be used for displaying augmented reality objects.

Since the real wide-format object 2 does not fit completely in the eyeshot of the video camera 12, only part of the real object indicated by the frame 21 is displayed on the display 11. In this part, the flat images 22 and 23 are displayed. They are displayed on the display 11 as 3D object models of augmented reality 13 and 14 respectively.

In this case, the proposed device 1 forms a general model of the augmented reality, so that when the device 1 moves, the 3D models of the augmented reality objects change without various undesirable effects, jumps, gluing, fading of the image.

This is achieved as follows:

Since the mutual arrangement of the parts of the wide-format object relative to each other is known, and we proceed from the assumption that the wide-format object is not changed (not torn, not crushed, etc.), accurate data on the spatial position of any of the wide-format object sections allow us to determine the spatial position of the whole object or any part of it.

Further, knowing which part of the wide-format object is currently visible (since the position of the device is also known to us), we can correct the displaying of the entire model or its parts accordingly.

EMBODIMENT OF THE INVENTION

The method for displaying the augmented reality object is implemented as follows, and includes the steps of scanning, extracting the texture, building a 3D model of the scanned object, applying texture and visualization.

Texture sensing is done by the texture sensing module. As an input, this module receives a set of frames from the camera of the device, as well as the corresponding conversion matrices (or similar data) from the sensing/tracking module. These matrices allow you to put a virtual camera in 3D space in relation to a virtual copy of the image of the object in such a way that on virtual and real images visible virtual and real objects are located identically. This allows using the overlay to position the video of the virtual space over the real one.

The ultimate aim of the texture sensing module is to extract the texture from the received video or photo frames by pixel-by-pixel transfer (possibly using interpolation, for example, bilinear) of the real object image onto an orthogonal two-dimensional grid. The two-dimensional image at the output of this module looks like a "scan" of the image of the real object, i.e. contains only the part of the image that interests us (the texture), without background, and does not have spatial distortions caused by taking photo (perspective, fisheye, etc.) (or they are minimized).

The calculated texture is assigned to certain sections and/or elements of the 3D model. When assigning a texture, parameters such as Tile and Offset can be set, which allows to affect the calculation of the texture coordinates for point P by the following formula:

$$F(X,Y) = UVW(\text{Offset} \cdot X + P \cdot X * \text{Tile} \cdot X, \text{Offset} \cdot Y + P \cdot Y * \text{Tile} \cdot Y)$$

Offset is a shift that allows to specify the offset relative to the original texture coordinates (on default (0,0)).

Tile is a scale that allows to specify how many times the texture is "stacked" in the unit UVW (on default (1,1)).

Thanks to this feature, the following method can be implemented:

If it is necessary to display only a part of the model that occupies a certain rectangular region P within the whole texture of the model T, such that P<T and P lies within the T. Then, when sensing the texture, only the P region is extracted, and thus a resource saving is achieved.

Thanks to the Tile and Offset parameters, it becomes possible to shift and scale the P region in such a way that the model remains unchanged compared to using a T-size texture.

Here is the most exhaustive example of the implementation of the invention, bearing in mind that this example does not limit the application of the invention.

According to FIG. 2:

Stage A.1. Photo or video image of individual fragments of the real object 21 are being received, until they completely compound the object 2.

Scanning of wide-format images is performed by a user with the device 1, while device 1 can send to the user requests and/or messages on how to move and position device 1 for optimal scan results. From a user's perspective, scanning can be done in two ways:

1. "By regions": device 1, used for displaying objects of augmented reality, sequentially points out different parts of the image for sensing. In this case, the scanned sections do not necessarily compound the whole image (because some parts of the image may be insignificant in terms of coloring—that is, thus they do not need to be sensed).

2. "Smoothly": the device 1, used for displaying objects of augmented reality, requests the user to move the phone smoothly over the image without pointing out specific areas. In this case, device 1 may request the user to display separately a portion that has been missed.

Stage A.2. A two-dimensional image of the real object is formed from the fragments obtained, and if there are not enough fragments to construct such a common image, a signal regarding the need to obtain an additional photo image or video image of the missing fragment of the real object is sent to the augmented reality object displaying device 1. A matrix for converting the coordinates of a photo or video image of a real object into its own coordinates is formed.

Stage A.3. The elements of the 3D model of the augmented reality object (shown on FIG. 1 as 13 and 14) are colored using the matrix of the coordinate transformation elements in the colors and/or textures of the corresponding photo or video elements of the real object in one of three options (shown on FIG. 1 as 22 and 23). In this case, the elements of the 3D model of the augmented reality object are colored with the corresponding elements of the photo or video image of the real object, by forming the texture of the image sensing area, using the coordinate transformation matrix, and interpolating the data, and then assigning the 3D texture of the augmented reality object, so that the corresponding polygons or, at least, some parts of the 3D model, are covered by the corresponding texture regions according to the coordinates formed at the texturizing stage.

Stage A.4.1. Texturizing is done by regions of individual elements of the 3D model of the augmented reality object (in FIG. 1 they are 13 and 14), by transferring the texture of the corresponding individual fragments of the real object (in FIG. 1 they are 22 and 23) (it's just a collection of N small images and N small scenes, each of which is scanned/painted independently, but they are all displayed together)

or

Stage A.4.2. Texturizing is done by regions of the 3D model of the augmented reality object indicating for each element of the 3D model, which portion of the texture it corresponds to. Using texture parameters, for each element of the 3D model corresponding to the element of the real object, a "pseudo-texture" is generated, which is equivalent to a large image as to the object, however only the area relevant to said element of the object is texturized correctly. This correspondence is achieved by overlaying the texture with the Tile/Offset parameters, which means that the "incorrect" regions of the textures do not occupy the memory. This approach avoids gluing of textures, and at the same time creates a sweep of the model relative to the whole image of the real object.

or

Stage A.4.3. Texturizing the entire 3D model of the augmented reality object is done at once with gluing of individual textured fragments into one common image. An empty image of the size corresponding to the whole real object 21 is created, after which it is applied to the scanned areas in a collage manner. Technological simplicity is compensated by the fact that the empty part of the "collage" will waste RAM.

Additionally, after applying the texture, the joints are mashed when glued together (including when the areas are covered with the entire image), which is the most resource-intensive option, but it provides a better quality/solid image at the output.

Stage A5. The 3D model of the augmented reality object is visualized over the video of the real object using the augmented reality tools and/or computer vision algorithms. For example, as shown in FIG. 1, the output is sent to the display 11 of the device 1.

The sequence of steps is exemplary, steps can be rearranged, excluded, added, or some operations can be performed simultaneously without losing the capability to interact with virtual objects.

Example. A Wide-Format City Map

Using a city map where houses and other objects are drawn, the actual dimensions of the unfolded map can be such that it is impossible in the room to place it completely in the eyeshot of the device 1 displaying objects of augmented reality, for example, a smartphone. The map fragments are being "looked into", by moving the smartphone over the map. The smartphone determines the images (markers), forms a three-dimensional model of the augmented reality objects, linking them to markers on the map, and thus, the user sees on the display how three-dimensional images of houses grow on the map, virtual cars can travel along the roads, virtual pedestrians walk along the sidewalks, virtual advertising in the city may appear. In this case, all the virtual objects are colorized into colors corresponding the colors of the flat images of the said objects on the. When the smartphone moves along the map, the image of real objects and objects of augmented reality changes smoothly.

INDUSTRIAL APPLICABILITY

The proposed method for displaying the object of augmented reality can be implemented by a specialist in practice and, when implemented it ensures the realization of the claimed purpose, which makes it possible to conclude that the criterion "industrial applicability" for the invention is met.

In accordance with the present invention, a prototype of a complex for interacting with virtual objects is made in the form of a computer tablet having a display and a video camera that implements a method for displaying the object of augmented reality.

Tests of the prototype complex showed that it provides the possibility of:

Defining objects (markers) of real three-dimensional space from images obtained from the device's video camera for creating and viewing augmented reality, the formation of a physical base coordinate system tied to the spatial position of objects of a real three-dimensional space, determination of the coordinates of the device for creating and viewing the augmented reality relative to the base coordinate system;

Assignment of coordinates of three-dimensional virtual objects of augmented reality in the base coordinate system;

Determination the device coordinate for creating and viewing augmented reality relative to a real physical object by analyzing the image from the device's camera, calculation of the vector corresponding to the direction from the object to the virtual camera in real time, the formation of information about all movements of the camera relative to the object—rotation, approximation, tilt by sequential iteration in real time, the formation of a general picture of the real object and the objects of augmented reality, the possibility of a smooth transition when the device displays various fragments.

Thus, the present invention achieves the objective of providing the possibility of displaying objects of augmented reality when scanning wide-screen real objects that do not fit entirely in the eyeshot of the video camera of the device for displaying the objects of augmented reality for which the augmented reality object is created.

What is claimed is:

1. A method of displaying an augmented reality object on a display of a computing device equipped with a camera and communication means, the method comprising the following steps:

forming a 3D model of the augmented reality object;

receiving a plurality of separate fragments of an image of a real object, wherein each fragment is a partial photo image of the real object obtained from the camera or extracted from a video stream taken by the camera;

forming a two-dimensional image of the real object by combining said received image fragments;

forming a transformation matrix of coordinates of the two-dimensional image of the real object corresponding to coordinates of the 3D model; and coloring elements of the 3D model using said matrix of coordinate transformation, by applying colors and/or textures of the corresponding elements of the real object represented by the two-dimensional image to the corresponding regions of the 3D model of the augmented reality object or by applying texture or color to the entire 3D model as a whole;

characterized in that forming of the two-dimensional image of the real object based on the received fragments further comprises:

determining if one or more fragments are missing to form said two-dimensional image, and sending a request to the device to obtain an additional photo or video image of the fragments that are missing.

2. The method according to claim 1, wherein applying texture to the corresponding regions of the 3D model of the augmented reality object is performed by superimposing textures of the corresponding elements of the real object on the corresponding regions of the 3D model.

3. The method according to claim 1, wherein texture mapping is performed and the regions of the 3D are textured with an indication for each such region which texture area of the two-dimensional image it corresponds to, wherein said texture mapping is performed using Tile and Offset parameters.

4. The method according to claim 1, where texture is applied to the entire 3D model of the augmented reality object at once by creating an empty image having a size corresponding to the whole real object and applying thereafter scanned regions with "gluing" separate texturized fragments.

5. The method according to claim 2, further comprising combining separate texturized fragments into one image and "mashing" seams between said fragments.

6. The method according to claim 5, where the "mashing" of the seams comprises the following steps:

determining pixels of a joint line between the texturized fragments, selecting pixels located at a distance N pixels to a right side and a left side for each of the joint pixels, and coloring pixels between said left and right pixels with a smooth gradient.

7. The method according to claim 3, wherein the regions are texturized by imposing the texture using Tile/Offset parameters, while "pseudo-texture" is generated for each image element, which, from an object's point of view, is equivalent to a large image, but only significant for said region.

* * * * *